United States Patent
Bobroff et al.

(10) Patent No.: US 9,256,469 B2
(45) Date of Patent: Feb. 9, 2016

(54) SYSTEM AND METHOD FOR IMPROVING MEMORY USAGE IN VIRTUAL MACHINES

(71) Applicant: International Business Machines Corporation, Armonk, NY (US)

(72) Inventors: Norman Bobroff, Katonah, NY (US); Michael Hilton Dawson, Ottawa, CA (US); Liana Liyow Fong, Irvington, NY (US); Arun Kwangil Iyengar, Yorktown Heights, NY (US); Peter Hans Westerink, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 292 days.

(21) Appl. No.: 13/738,814

(22) Filed: Jan. 10, 2013

(65) Prior Publication Data
US 2014/0196049 A1    Jul. 10, 2014

(51) Int. Cl.
*G06F 9/455*      (2006.01)
*G06F 9/50*       (2006.01)
*G06F 3/06*       (2006.01)

(52) U.S. Cl.
CPC ............ *G06F 9/5016* (2013.01); *G06F 3/0604* (2013.01); *G06F 9/455* (2013.01); *G06F 9/45558* (2013.01); *G06F 9/5022* (2013.01); *G06F 2009/45583* (2013.01)

(58) Field of Classification Search
None
See application file for complete search history.

(56) References Cited

U.S. PATENT DOCUMENTS

| | | | |
|---|---|---|---|
| 6,842,759 B2 * | 1/2005 | Haggar et al. | |
| 6,971,097 B1 * | 11/2005 | Wallman | 718/101 |
| 7,467,278 B2 * | 12/2008 | Creamer et al. | 711/170 |
| 7,500,080 B2 * | 3/2009 | Achanta et al. | 711/171 |
| 7,529,786 B2 * | 5/2009 | Andreasson | |
| 7,587,721 B2 * | 9/2009 | Schmidt et al. | 719/319 |
| 7,716,451 B2 * | 5/2010 | Creamer et al. | 711/170 |
| 7,779,238 B2 | 8/2010 | Kosche et al. | |
| 7,904,540 B2 * | 3/2011 | Hadad | G06F 9/4856 709/223 |

(Continued)

FOREIGN PATENT DOCUMENTS

| | | |
|---|---|---|
| WO | WO2008144566 A1 | 11/2008 |
| WO | WO2011034717 A1 | 3/2011 |
| WO | WO2012067688 A1 | 5/2012 |

OTHER PUBLICATIONS

Berry, "Trends, challenges and opportunities for performance engineering with modern business software," IEE Proc.-Softw., vol. 150, No. 4, Aug. 2003.

(Continued)

*Primary Examiner* — Van Nguyen
(74) *Attorney, Agent, or Firm* — Janice Kwon, Esq.; McGinn IP Law Group, PLLC

(57) ABSTRACT

A method (and system) for managing memory among virtual machines in a system having a plurality of virtual machines, includes providing at least one memory optimization mechanism which can reduce memory usage of a virtual machine at a cost of increasing CPU usage. Information on memory usage and CPU usage of each virtual machine is periodically collected. In response to detecting that a first virtual machine exhibits a high level of memory use, at least one second virtual machine with extra CPU capacity is identified. The at least one memory optimization mechanism is applied to the at least one second virtual machine, to reduce memory used by the at least one second virtual machine, thereby providing a portion of freed memory. The portion of freed memory is then allocated to the first virtual machine.

25 Claims, 6 Drawing Sheets

(56) References Cited

U.S. PATENT DOCUMENTS

| | | | |
|---|---|---|---|
| 8,019,861 B2 * | 9/2011 | Ginzton | 709/224 |
| 8,156,492 B2 * | 4/2012 | Dahlstedt | 718/1 |
| 8,370,836 B2 * | 2/2013 | Shetty | G06F 9/5077 713/300 |
| 8,429,276 B1 | 4/2013 | Kumar | |
| 8,578,370 B2 * | 11/2013 | Dai et al. | 717/174 |
| 8,601,471 B2 * | 12/2013 | Beaty et al. | 718/1 |
| 8,631,401 B2 * | 1/2014 | Bansal et al. | 718/1 |
| 8,667,019 B2 * | 3/2014 | Mehra et al. | 707/790 |
| 8,826,270 B1 | 9/2014 | Lewis et al. | |
| 8,843,895 B2 * | 9/2014 | McFadden et al. | 717/124 |
| 8,881,149 B2 * | 11/2014 | Dawson et al. | 718/1 |
| 8,886,866 B2 * | 11/2014 | Arcese et al. | 711/6 |
| 8,918,784 B1 * | 12/2014 | Jorgensen et al. | 718/1 |
| 2003/0182597 A1 | 9/2003 | Coha et al. | |
| 2005/0262512 A1 * | 11/2005 | Schmidt et al. | 719/310 |
| 2007/0136402 A1 * | 6/2007 | Grose et al. | 707/206 |
| 2007/0204266 A1 * | 8/2007 | Beaty et al. | 718/1 |
| 2008/0034365 A1 | 2/2008 | Dahlstedt | |
| 2008/0091909 A1 * | 4/2008 | Hwang | 711/170 |
| 2009/0265707 A1 | 10/2009 | Goodman et al. | |
| 2010/0274947 A1 | 10/2010 | Ohta et al. | |
| 2011/0072427 A1 | 3/2011 | Garmark | |
| 2011/0320681 A1 | 12/2011 | Borntraeger et al. | |
| 2011/0320682 A1 | 12/2011 | McDougall et al. | |
| 2012/0167083 A1 * | 6/2012 | Suit | 718/1 |
| 2012/0185854 A1 * | 7/2012 | Dahlstedt | 718/1 |
| 2013/0054426 A1 * | 2/2013 | Rowland et al. | 705/27.2 |
| 2014/0137110 A1 | 5/2014 | Engle et al. | |

OTHER PUBLICATIONS

VMware, Understanding Memory Resource Management in VMware ESX 4.1.

Min et al., "Hardware assisted dynamic memory balancing in virtual Machines," IEICE Electronics Express, vol. 8 (2011) No. 10.

United States Office Action dated Apr. 2, 2015 in U.S. Appl. No. 13/782,661.

United States Office Action dated Oct. 5, 2015 in U.S. Appl. No. 13/782,661.

* cited by examiner

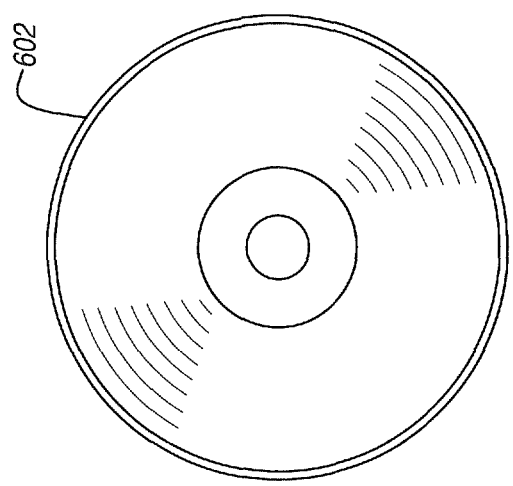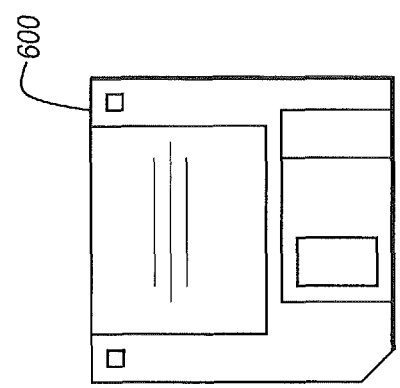
FIGURE 6

SYSTEM AND METHOD FOR IMPROVING MEMORY USAGE IN VIRTUAL MACHINES

BACKGROUND OF THE INVENTION

1. Field of the Invention

The present invention relates generally to memory optimization and improving the efficiency of real memory use by applications and computing platforms such as physical and virtual machines. More specifically, in a system having a plurality of virtual machines, information is periodically collected on memory and CPU usage of each virtual machine and a memory optimizer uses this information to re-allocate memory among the virtual machines, as based on at least one memory optimization mechanism which can reduce memory usage of a virtual machine at a cost of increasing CPU usage.

2. Background of the Invention

It is often important to run multiple virtual machines (VMs) concurrently, particularly in cloud computing environments, where multiple applications can be run concurrently. However, poor memory usage can make a system almost unusable, as, for example, when too much paging between memory and disk can slow the system down.

SUMMARY OF THE INVENTION

In view of the foregoing and other exemplary problems, drawbacks, and disadvantages of conventional methods and systems, an exemplary feature of the present invention is to provide a method and structure to dynamically allocate memory between concurrently-running virtual machines.

In a first exemplary aspect of the present invention, described herein is a method for managing memory among virtual machines in a system having a plurality of virtual machines, including providing at least one memory optimization mechanism which can reduce memory usage of a virtual machine at a cost of increasing central processing unit (CPU) usage; periodically collecting information on the memory and CPU usage of each virtual machine; in response to detecting that a first virtual machine exhibits a high level of memory use, identifying at least one second virtual machine with extra CPU capacity; applying the at least one memory optimization mechanism to the at least one second virtual machine to reduce the memory used by the at least one second virtual machine, thereby providing a portion of freed memory; and allocating the portion of freed memory to the first virtual machine.

In a second exemplary aspect of the present invention, also described herein is a method of controlling a memory allocation among a plurality of concurrently-running virtual machines (VMs), including monitoring a central processing unit (CPU) usage and a memory usage of each said VM; detecting that a first VM of the plurality of concurrently-running VMs requires more memory; and exercising a memory allocation mechanism for allocating additional memory to the first VM; and allocating the additional memory to the first VM, wherein the additional memory to be allocated is determined based upon considering a cost of increasing a central processing unit (CPU) usage of the concurrently-running VMs in order to reallocate memory to said first VM.

In a third exemplary aspect of the present invention, also described herein is a method of controlling a memory allocation among a plurality of concurrently-running virtual machines (VMs), including: setting a target central processing unit (CPU) usage level for each said VM; monitoring a CPU usage and a memory usage of each said VM; detecting that a virtual machine is exceeding its target CPU usage level; and reducing a level of a memory optimization being executed on said virtual machine detected as exceeding its target CPU usage level.

BRIEF DESCRIPTION OF THE DRAWINGS

The foregoing and other exemplary purposes, aspects and advantages will be better understood from the following detailed description of an exemplary embodiment of the invention with reference to the drawings, in which:

FIG. 6 exemplarily shows portable memory devices 600, 602 that could be used for storing machine code that implements the present invention.

DETAILED DESCRIPTION OF EXEMPLARY EMBODIMENTS OF THE INVENTION

Figure 1:
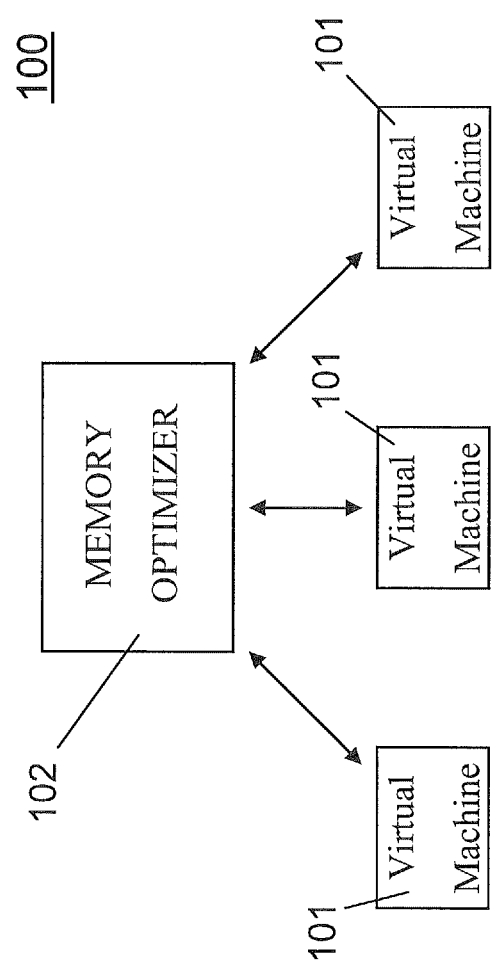
FIG. 1 exemplarily depicts a system 100 in accordance with the invention for optimizing memory usage among multiple virtual machines 101.

FIG. 1 depicts an exemplary system having features of the present invention. A memory optimizer 102 optimizes memory use across multiple virtual machines 101. The memory optimizer could be implemented in software and can execute on one or multiple processor nodes. The virtual machines 101 may also execute on one or more processor nodes.

Virtual machines may be implemented in multiple ways including but not limited to IBM's Dynamic Logical Partitioning (DLPAR) (described in various publications, including an internal IBM web page identified in the cited reference section on the front page of the issued patent version of this disclosure. This publication explains how DLPAR provides the ability to logically attach and detach a managed system's resources to and from a logical partition's operating system without rebooting. The contents of this publication are incorporated herein by reference), VMware virtualization platforms such as ESX, Xen, KVM, Java virtual machines, etc. Information on commonly used virtualization platforms is available in a number of publications, including a generic description in a wikipedia article entitled "Comparison_of_platform_virtual_machines". The contents of this publication are incorporated herein by reference.

This publication explains how platform virtual machines are software packages that emulate a whole physical computer machine, often providing multiple virtual machines on one physical platform. This publication also provides a comparison of basic information about a relatively large number of platform virtual machine (VM) packages.

The memory optimizer 102 of the present invention could run on one or more nodes on which the virtual machines 101 execute. Alternatively, the memory optimizer 102 could run on one or more nodes which are distinct from the one or more nodes on which the virtual machines 101 execute. Alternatively, the memory optimizer 102 could run one or more nodes on which the virtual machines 101 execute as well as one or more nodes which are distinct from the one or more nodes on which the virtual machines 101 execute.

The piece of software, firmware, or hardware that creates and runs virtual machines is often referred to as a hypervisor. All or a fraction of the memory optimizer 102 could be part of a hypervisor. However, this is not necessary. The memory optimizer 102 can also execute independently from a hypervisor.

In the context of explaining the present invention, there is a pool of memory that can be allocated to multiple virtual machines. In other words, some memory m1 could be allocated to either virtual machine vm1 or virtual machine vm2. If vm1 has a lot of free memory while vm2 has little free memory, it is preferable to allocate m1 to vm2. By contrast, if vm2 has a lot of free memory while vm1 has little free memory, it is preferable to allocate m1 to vm1.

The memory optimizer 102 determines how memory should be allocated to different virtual machines. If vm1 has a lot of free memory while vm2 is running low on free memory, memory optimizer 102 might allocate some of vm1's free memory to vm2.

Once a virtual machine 101 starts running low on memory, its performance can degrade considerably. In some cases, insufficient memory can cause applications to not execute properly at all. It is therefore desirable to maintain proper amounts of memory for all virtual machines 101. If sufficient memory exists throughout the system, the memory optimizer 102 can allocate memory across the virtual machines 101 to provide enough memory for each virtual machine 101. If there is not enough memory in the system to prevent a virtual machine 101 from running low on memory, other actions need to be taken.

There are various special techniques that can be deployed to reduce the memory consumed by a virtual machine. One such technique is memory compression. Another technique is memory deduplication, in which duplicate memory pages are identified. Memory deduplication stores a single copy of duplicate memory pages. A third technique is delta encoding. For two pages p1 and p2 which are similar but not identical, it is not necessary to store entire versions of both p1 and p2. Instead, p1 could be stored along with a delta which encodes just the differences between p1 and p2. The delta would typically be considerably smaller than p2.

The use of these and other techniques for virtual machines is described in D. Gupta et al, "Difference Engine: Harnessing Memory Redundancy in Virtual Machines", Proceedings of OSDI 2008, the contents of which is incorporated herein by reference. There are other techniques that can be applied to reduce memory usage as well. For example, a virtual machine 101 might be a Java virtual machine (abbreviated JVM) running a Java workload. An overview of JVMs is described in various publications, including a Wikipedia article "Java virtual machine", the content of which is incorporated herein by reference. Java allocates memory from an area known as the heap. In order to free memory from the heap, garbage collection is needed.

The concepts of "heap" and "garbage collection" are further explained in various publications, such as the Wikipedia article entitled "programming language", the Wikipedia article entitled "memory management", and the Wikipedia article entitled "garbage collection", the contents of these articles being hereby incorporated herein by reference. In summary, memory management is the process of managing computer memory, including mechanisms to dynamically allocate portions of memory to programs upon request and freeing it for reuse when no longer needed. Memory requests are satisfied by allocating portions from a large pool of memory referred to as "the heap", and, at any given time, some parts of the heap are in use while some are "free" (i.e., unused) and thus available for future allocations.

Garbage collection is a form of automatic memory management that attempts to reclaim "garbage", as referring to memory occupied by objects that are no longer in use by a program. Garbage collection is often portrayed as the opposite of manual memory management, a mechanism in which the programmer specifies which objects to deallocate and return to the memory system. Many computer languages, such as Java, C#, and several scripting languages, require garbage collection either as part of the language specification or effectively for practical implementation, while other languages, such as C, C++, were designed for use with manual memory management but have garbage collected implementations available. Still others, such as Ada, Modula-3, and C++/CLI allow both garbage collection and manual memory management to co-exist in the same application by using separate heaps, and others, such as D, are garbage collected but allow the user to manually delete objects and disable garbage collection when speed is required.

The entity that performs garbage collection is known as the garbage collector. Garbage collectors are typically implemented in software, but they can also be implemented using both software and hardware. For example, a system might have special hardware support to aid garbage collection.

Returning now to an exemplary embodiment of the present invention using JVM, if a smaller maximum heap size is used, the JVM consumes less memory. However, the garbage collector needs to run more frequently, which uses up additional CPU cycles. Thus, there is once again a memory/CPU tradeoff. Larger maximum heap sizes use up more memory for the heap but save CPU cycles because less frequent garbage collections are needed. Smaller maximum heap sizes use up less memory but use more CPU cycles because more frequent garbage collections are needed.

Note that this technique of modifying Java heap space is applicable to other languages with automatic memory management and garbage collection, such as Lisp, Smalltalk, C#, many scripting languages, etc. The present invention is applicable to languages which use garbage collection in general. The term "heap" refers to the memory area managed using garbage collection and is not specific to the Java programming language. However, for ease of exposition, we exemplarily discuss concepts of the present invention in terms of Java and Java virtual machines. One skilled in the art could easily apply this invention to other languages with garbage collection.

Other techniques besides those mentioned above can be used for optimizing memory usage within the spirit and scope of this invention.

As recognized by the present inventors, a key problem with these techniques is that they consume CPU overhead. Thus, while they improve memory usage, they hurt CPU performance. The present inventors have recognized that what is needed is a selective way to apply these techniques. That is what the present invention provides, Thus, in the present invention, memory optimizer 102 shown in FIG. 1 takes a global view of all virtual machines 101 that potentially can be allocated memory under its control, as follows. When free memory throughout the system is low and a particular virtual machine 101 needs more memory, the memory optimizer identifies one or more virtual machines 101 which has spare CPU capacity to apply an optimization to free up memory. That way, a virtual machine 101 running on hardware with little spare CPU capacity will not have to devote additional CPU cycles in order to free up memory.

Figure 2:
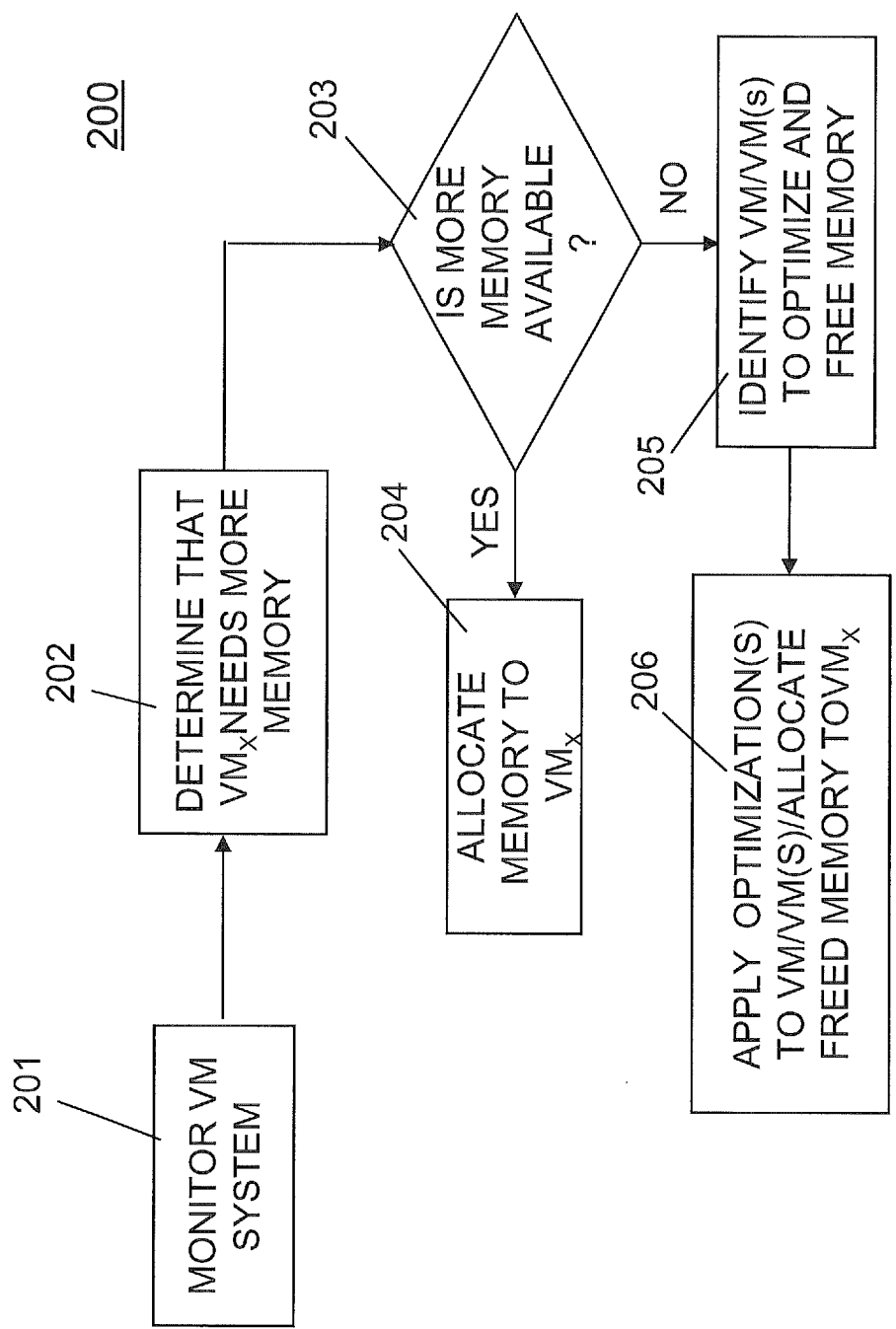
FIG. 2 is a description in flowchart format 200 of an exemplary method in accordance with the invention for optimizing memory usage among multiple virtual machines.

FIG. 2 depicts an exemplary method for managing memory across multiple virtual machines 101. In Step 201, the memory optimizer 102 is continuously monitoring the system. It collects information such as memory usage of virtual machines, CPU usage of virtual machines, etc. For such information collection, memory optimizer 102 can use standard tools (e.g. vmstat) in operating systems such as Linux, other variants of Unix, Windows, etc. to collect this information. Other methods and tools can also be used to monitor memory and CPU usage within the spirit and scope of this invention.

In step 202, memory optimizer 102 determines that a particular virtual machine VMx (e.g., VM1) needs more memory. This can be done in several ways.

For example, memory optimizer 102 might determine that the amount of free memory available to VM1 is decreasing and getting close to 0 (memory which is available to a virtual machine 101 but is not being used is "free memory"); more specifically, the amount of free memory may fall below a threshold. Alternatively, the memory optimizer 102 might determine that VM1 has no free memory and is paging. Alternatively, the memory optimizer 102 might have predictions of future memory needs for VM1 based on empirical data of VM1's memory usage in the past. Even though VM1 currently has some free memory, the memory optimizer 102 might predict that VM1 is likely to run out of memory in the near future unless it is given more memory. Other methods for determining that VM1 needs more memory are possible within the spirit and scope of the invention.

The memory optimizer 102 has a global view of how much memory each virtual machine 101 has available to it and how much memory a virtual machine 101 is using. If, in step 203, the memory optimizer 102 determines that sufficient free memory exists from other virtual machines 101 to satisfy the memory needs of VM1, the memory optimizer 102, in step 204, allocates additional memory to VM1 from one or more other virtual machines 101 with free memory.

If the memory optimizer 102 determines in step 203 that sufficient free memory from other virtual machines 101 does not exist to fully satisfy the memory needs of VM1, the memory optimizer in step 205 tries to identify one or more virtual machines 101 which can free up memory to give to VM1 by applying an optimization. Such optimizations include but are not limited to the aforementioned memory compression, memory deduplication, delta encoding, and reducing heap space for Java applications and/or applications in other programming languages with automatic memory management and garbage collection.

The memory optimizer 102 uses knowledge of specific optimizations to estimate both the CPU overhead of applying an optimization and the amount of memory which would be freed by applying the optimization. For example, information on memory used by specific applications can be analyzed to determine both the amount of memory saved and the CPU overhead incurred for applying optimizations such as memory compression, memory deduplication, and delta encoding.

A specific example of a possible mechanism the memory optimizer 102 could use to estimate both the CPU overhead of applying an optimization and the amount of memory which could be freed by applying the optimization is IBM's amepat tool (Active Memory™ Expansion Planning and Advisory Tool), described in various publications including internal IBM publication located at the URL address identified in the references section. The content of this publication, incorporated herein by reference, describes amepat. Amepat provides information on memory saved and CPU overhead incurred by memory compaction.

Another example of how the overhead of applying an optimization and the amount of memory which could be freed by applying the optimization could be estimated is the following. For programming languages using garbage collection, such as Java, empirical data can be collected on overhead incurred by garbage collection as a function of heap size. If memory usage of individual applications is profiled, these estimates of garbage collection overheads can be more accurate. From this data, the memory optimizer 102 will be able to estimate the effect of heap size on garbage collection overhead. If a virtual machine has sufficient excess CPU capacity, the memory optimizer 102 can reduce the Java heap size appropriately to free up memory.

Based on estimates of CPU overhead incurred for an optimization and the memory expected to be freed, the memory optimizer 102 determines which optimization(s) should be applied to which virtual machines 101 to free memory. The CPU load on the virtual machines 101 is an important part of the decision. If a virtual machine 101 has high CPU utilization or is predicted to have high CPU utilization in the near future, that virtual machine 101 is not a good candidate to which to apply a CPU-intensive memory optimization. On the other hand, if a virtual machine 101 is consuming few CPU cycles and is not predicted to have a significant increase in CPU consumption in the near future, that virtual machine might be a better candidate for applying the memory optimization, provided the virtual machine is predicted to release a significant amount of memory as a result of applying the optimization.

Memory usage by a virtual machine 101 is also used to determine whether it is a good candidate for giving up memory. If a virtual machine 101 is not using up much memory, then it is not a good candidate for giving up memory by applying an optimization since it has little memory to give. If, on the other hand, a virtual machine 101 is using up a lot of memory which could be freed by applying an optimization, then it is a good candidate for giving up memory by applying an optimization.

There are several different criteria which can be applied to determine which optimizations should be applied to which virtual machine, including, but not limited to the following:

- If a virtual machine's predicted CPU utilization after applying the optimization is below a threshold value (e.g. 0.5), apply the optimization.
- If a virtual machine's predicted CPU utilization after applying the optimization is below a threshold value and the amount of memory predicted to be freed by the optimization exceeds a threshold (e.g. 100 Megabytes), apply the optimization.
- If a virtual machine's predicted CPU utilization after applying the optimization is below a threshold value and the amount of memory predicted to be freed by the optimization exceeds a threshold proportion of the memory needed by VM1, (e.g. 0.05), apply the optimization.
- Each virtual machine has a target CPU utilization. Give priority to applying optimizations to virtual machines which have the highest value of target CPU utilization minus actual CPU utilization.
- Each virtual machine has a target memory usage. Give priority to applying optimizations to virtual machines which have the lowest values of target memory utilization minus actual memory utilization.

It should be mentioned that each of the thresholds mentioned above could be different for different virtual machines 101. Alternatively, one or more thresholds could be the same for one or more virtual machines.

The memory optimizer 102 may apply one or more of the criteria above in determining which optimizations to apply to which virtual machines 101. For example, the memory optimizer 102 could give priority to applying optimizations to virtual machines which have the highest value of target CPU utilization minus actual CPU utilization while also giving priority to applying optimizations to virtual machines which have the lowest values of target memory utilization minus actual memory utilization.

It may be possible to apply multiple different optimizations to free up memory. In this case, memory optimizer 102 makes intelligent choices of which optimization (s) to apply, and to what degree. Thus, in an exemplary embodiment of the present invention, memory optimizer 102 can make the choices of which optimization (s) to apply (or increase use of) using the following guidelines:

Give priority to optimizations which consume relatively few CPU cycles.
Give priority to optimizations which result in relatively more memory savings.
Consider both the memory saved by an optimization and its CPU overhead in determining which optimization (s) to apply (or increase use of). An optimization is a good candidate if it is both relatively inexpensive in CPU cost and saves a relatively high amount of memory compared with other optimizations.

Memory optimizer 102 can also use other guidelines to determine which optimization (s) to apply or to increase use of.

In step 206, one or more optimizations are applied (and/or the application of one or more optimizations currently being used is increased). The memory freed by the one or more optimizations is given to virtual machine vm1.

The memory optimizer 102 also has the ability to reduce (or eliminate use of) the amount of an optimization applied to a virtual machine 101 if the virtual machine 101 is consuming too many CPU cycles. This is illustrated in FIG. 3.

Figure 3:
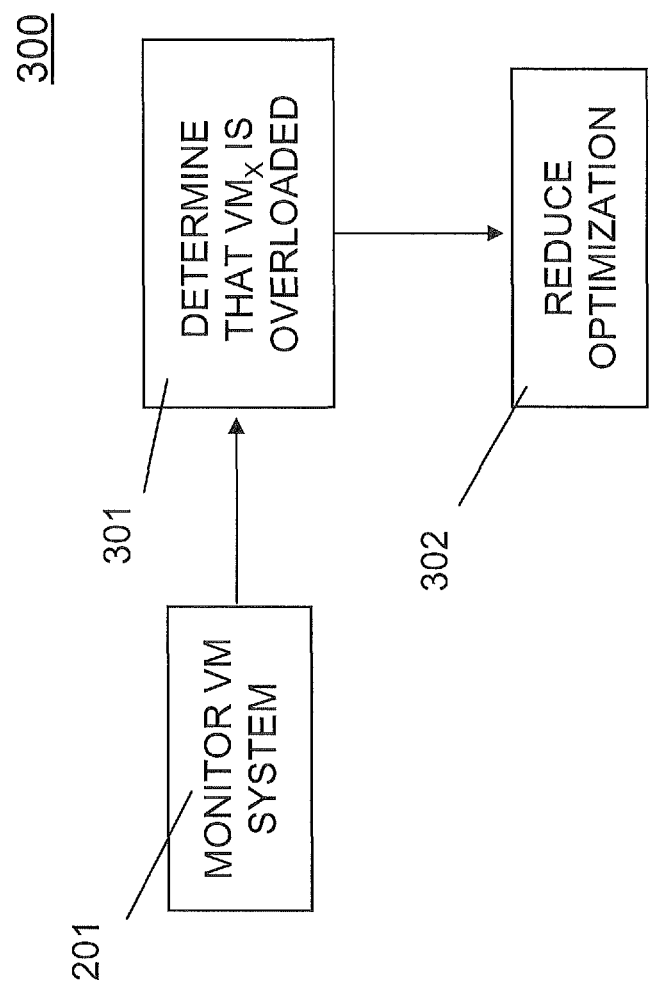
FIG. 3 is a description in flowchart format 300 of an exemplary method in accordance with the invention for handling excess CPU usage.

In step 201 of FIG. 3, the memory optimizer monitors the system. This is the same step as step 201 in FIG. 2. In step 301, memory optimizer 102 detects a virtual machine VMx (e.g., VM2) which is consuming too many CPU cycles. For example, VM2 might have a CPU utilization exceeding a predetermined threshold, such as 90%. CPU utilization statistics may be determined from one or more measurements. In the case of multiple CPU utilization measurements, an aggregate figure, such as an average CPU utilization, may be determined. In some cases, step 301 might determine that even though VM2 is not currently consuming too many CPU cycles, it is likely to do so in the near future based on an analysis of past behavior, and action must be taken now to prevent CPU overload from occurring. The memory optimizer 102 then determines what optimizations, if any, are being applied by VM2. If it detects optimizations being applied to VM2, it reduces (or eliminates) the level of one or more optimizations to reduce CPU usage in step 302. As mentioned above, optimizations might include, but are not limited to, memory compression, memory deduplication, delta encoding, reducing heap space for Java applications and/or applications in other programming languages with automatic memory management and garbage collection. For example, the optimizer could increase the size of a Java heap in step 302 to reduce CPU cycles consumed by garbage collection.

There are multiple methods by which memory optimizer 102 could reduce (or eliminate) the amount of one or more optimizations applied to VM2. These include but are not limited to the following:

VM2 has a threshold CPU utilization (e.g. 0.5) which is being exceeded. Reduce (or eliminate) optimizations to bring the CPU utilization for VM2 within the threshold CPU utilization.
Multiple optimizations are being applied to VM2. Give priority to reducing (or eliminating) optimizations which consume significant CPU cycles.
Multiple optimizations are being applied to VM2. Give priority to reducing (or eliminating) optimizations which result in less memory saved.
Multiple optimizations are being applied to VM2. Consider both the memory saved by an optimization and its CPU overhead in detei Dining which optimization (s) to reduce. An optimization is a good candidate to reduce (or eliminate) if it is both relatively expensive in CPU cost and saves relatively little compared with other optimizations.

Exemplary Hardware Implementation

Figure 4:
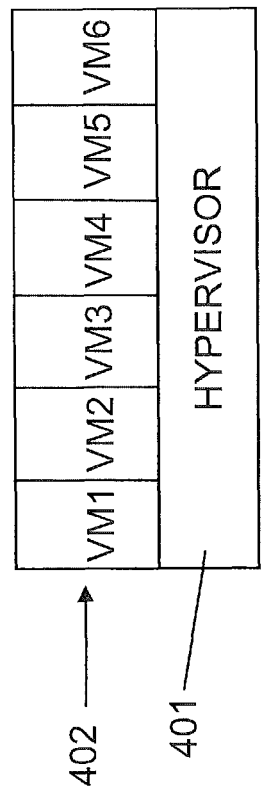
FIG. 4 exemplarily shows a computer system 400 for implementing the present invention.

From the exemplary embodiments described above, it is clear that the present invention is directed to controlling memory allocation for virtual machines and involves control concepts that would typically involve software. However, as is well known in the art, software implementation inherently involves underlying hardware. FIG. 4 exemplarily demonstrates a computer system 400 upon which a plurality of virtual machines operate using a hypervisor 401 that allocates and controls machine assets for a plurality of LPARs (logical partitions) upon which are respectively running VMs 402. This system 400 might involve a single computer or could be implemented across a network of interconnected computers. As pointed out about, exemplary embodiments of the present invention involve DLPAR, in which computer resources can be dynamically reallocated without rebooting.

Figure 5:
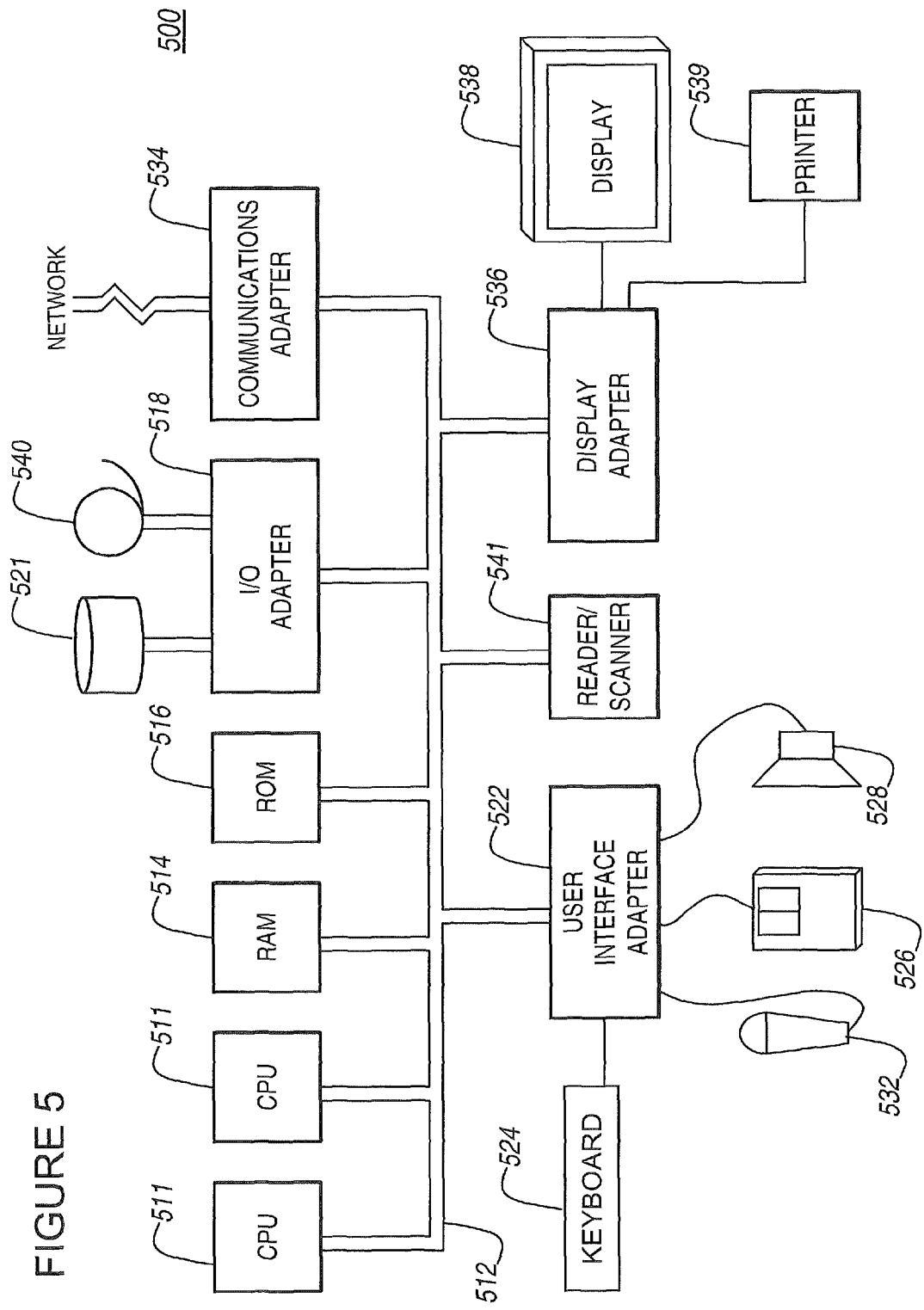
FIG. 5 exemplarily shows hardware aspects 500 of a computer system implementing the present invention.

FIG. 5 illustrates a typical hardware configuration of an information handling/computer system in accordance with the invention and which preferably has at least one processor or central processing unit (CPU) 511. In the context of the present invention, this computer would typically be a server on a network.

The CPUs 511 are interconnected via a system bus 512 to a random access memory (RAM) 514, read-only memory (ROM) 516, input/output (I/O) adapter 518 (for connecting peripheral devices such as disk units 521 and tape drives 540 to the bus 512), user interface adapter 522 (for connecting a keyboard 524, mouse 526, speaker 528, microphone 532, and/or other user interface device to the bus 512), a communication adapter 534 for connecting an information handling system to a data processing network, the Internet, an Intranet, a personal area network (PAN), etc., and a display adapter 536 for connecting the bus 512 to a display device 538 and/or printer 539 (e.g., a digital printer or the like).

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of non-transitory signal-bearing storage media.

Thus, this aspect of the present invention is directed to a programmed product, comprising non-transitory signal-bearing storage media tangibly embodying a program of machine-readable instructions executable by a digital data processor incorporating the CPU 511 and hardware above, to perform the method of the invention.

This signal-bearing storage media may include, for example, a RAM device 514 contained within the CPU 511, as represented by the fast-access storage, for example, and used for programs being currently executed, or a ROM device 516 storing program instructions not currently being executed. Alternatively, the instructions may be contained in another signal-bearing storage media, such as a magnetic data storage diskette 600 (FIG. 6), directly or indirectly accessible by the CPU 511.

Whether contained in the diskette 600, the computer/CPU 511, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing storage media including memory devices in transmission hardware, communication links, and wireless, and including different formats such as digital and analog. In an illustrative embodiment of the invention, the machine-readable instructions may comprise software object code.

As is readily apparent from the above description, the present invention discusses a new method for dynamically controlling memory allocation for a plurality of concurrently-operating VM's, as based on applying one or more memory optimization mechanisms for reducing memory usage of a VM taking into account a cost of increasing CPU usage. The method also permits CPU usage to be controlled, as related to memory usage.

Although the present invention has been described in various exemplary embodiments, it should be apparent that variations of this exemplary embodiment are possible and considered as included in the present invention.

Therefore, it is noted that, Applicants' intent is to encompass equivalents of all claim elements, even if amended later during prosecution.

What is claimed is:

1. In a system comprised of a plurality of virtual machines, a method for managing memory among the virtual machines, the method comprising:
    providing at least one memory optimization mechanism, as executed by at least one processor on at least one computer, which can reduce a memory usage of a virtual machine at a cost of increasing a central processing unit (CPU) usage;
    periodically collecting information on a memory usage and a CPU usage of each virtual machine;
    in response to a first virtual machine exhibiting a high level of memory use, identifying at least one second virtual machine with an extra CPU capacity;
    applying, to the at least one second virtual machine the at least one memory optimization mechanism, to reduce memory used by the at least one second virtual machine, thereby providing a portion of freed memory; and
    allocating the portion of freed memory to the first virtual machine.

2. The method of claim 1, wherein the at least one memory optimization mechanism comprises reducing a heap size corresponding to a memory area managed by a garbage collector.

3. The method of claim 2, further comprising:
    collecting empirical data on a garbage collection overhead as a function of heap size; and
    using the empirical data to determine a heap size for said at least one second virtual machine.

4. The method of claim 2, wherein the memory area managed by a garbage collector comprises memory supporting the execution of at least one program written in at least one of Java, Lisp, C#, and Smalltalk.

5. The method of claim 1, wherein the at least one memory optimization mechanism comprises at least one of memory compression, memory deduplication, and delta encoding.

6. The method of claim 1, wherein said first virtual machine exhibiting a high level of memory usage comprises one of a level of memory usage of said first virtual machine exceeding a threshold and said first virtual machine exhibiting memory paging.

7. The method of claim 1, further comprising:
    maintaining information on memory usage from the past; and
    using said information on memory usage from the past to determine that said first virtual machine will likely exceed the amount of memory currently assigned to it in the near future.

8. The method of claim 1, wherein the plurality of virtual machines includes a plurality of virtual machines distinct from the first virtual machine each with an extra CPU capacity, the method further comprising:
    identifying the at least one second virtual machine with an extra CPU capacity by giving preference to virtual machines with one of higher extra CPU capacities and higher memory usage.

9. The method of claim 1, wherein a plurality of memory optimization mechanisms which can reduce a memory usage of a virtual machine at a cost of increasing a central processing unit (CPU) usage are provided, the method further comprising:
    identifying the at least one memory optimization to apply to the at least one second virtual machine with an extra CPU capacity by giving preference to memory optimizations which at least one of free up more memory and consume fewer CPU cycles.

10. The method of claim 1, further comprising:
    in response to detecting that a virtual machine vm1 which is applying a memory optimization mechanism of which can reduce a memory usage of a virtual machine at a cost of increasing a central processing unit (CPU) usage has a high level of CPU usage, reducing or stopping application of said memory optimization mechanism o1.

11. The method of claim 10, wherein said virtual machine vm1 selectively applies a plurality of a memory optimization mechanisms which can reduce a memory usage of a virtual machine at a cost of increasing a central processing unit (CPU), the method further comprising selecting said memory optimization mechanism of by giving preference to memory optimization mechanisms which at least one of:
    consume more cpu cycles; and
    free up less memory.

12. The method of claim 1, further comprising:
    upon determining that said first virtual machine is exhibiting said high level of memory use, initially determining whether additional memory is available without having to free memory from another virtual machine; and
    if such additional memory is available, then allocating at least a portion of the additional memory to said first virtual machine.

13. The method of claim 1, further comprising:
    setting a predetermined threshold of CPU usage for each said virtual machine;

determining whether a virtual machine will continue to operate below its CPU usage threshold if memory current allocated to that virtual machine were to be freed; and freeing memory from that virtual machine only if its CPU usage will remain below its CPU usage threshold, by said applying the at least one memory optimization mechanism to that virtual machine and deallocating memory from that virtual machine of memory freed up by the at least one memory optimization mechanism.

14. The method of claim 1, further comprising:

setting a target CPU usage level for each said virtual machine; and providing a priority among said virtual machines for said applying the at least one memory optimization mechanism, said priority being based upon a difference between a current CPU usage level of a virtual machine and its target CPU usage level.

15. The method of claim 14, further comprising:

detecting that a virtual machine is exceeding its target CPU usage level; and reducing a level of optimization being executed on said virtual machine detected as exceeding its target CPU usage level.

16. The method of claim 1, further comprising:

setting a target memory usage level for each said virtual machine; and providing a priority among said virtual machines for said applying the at least one memory optimization mechanism, said priority being based upon a difference between a current memory usage level of a virtual machine and its target memory usage level.

17. The method of claim 1, wherein said system comprises a plurality of virtual machines operating on a plurality of computers interconnected in a network.

18. The method of claim 1, as embodied in set of computer-readable instructions stored in a non-transitory, computer-readable storage device.

19. The method of claim 18, wherein said computer-readable storage device comprises one of:

a read-only memory (ROM) device that stores instructions not currently being executed on a computer;

a random access memory (RAM) device that stores instructions for a program currently being executed by a processor on a computer;

a portable standalone storage device that stores instructions for selectively downloading said instructions into a computer memory when interfaced with an input device of said computer; and a storage device on a server connected to a network, for downloading said stored instructions to another computer connected to said network.

20. A method of controlling a memory allocation among a plurality of concurrently-running virtual machines (VMs), said method comprising:

monitoring a central processing unit (CPU) usage and a memory usage of each VM of said plurality of concurrently-running VMs, as executed by at least one processor on at least one computer;

detecting that a first VM of the plurality of concurrently-running VMs requires more memory; and exercising a memory allocation mechanism for allocating additional memory to the first VM; and allocating the additional memory to the first VM, wherein the additional memory to be allocated is determined based upon considering a cost of increasing a central processing unit (CPU) usage of the concurrently-running VMs in order to reallocate memory to said first VM.

21. The method of claim 20, wherein the memory allocation mechanism for allocating additional memory comprises:

determining initially if any free memory not currently used by any of the other VMs of said plurality of VMs is available, and, if so, allocating at least a portion of said free memory to said first VM, the additional memory thereby being allocated to said first VM at no addition increase of CPU usage of any of said concurrently-running VMs; and if no free memory is currently available, determining whether any of the other VMs of said plurality of VMs can free up memory if one or more memory optimization mechanisms were to be applied, and, if so, allocating said freed up memory to said first VM, wherein said determining whether a VM can free up memory considers a CPU overhead cost in applying said one or more memory optimization mechanisms.

22. The method of claim 20, wherein said one or more memory optimization mechanisms comprise one or more of:

a memory compression mechanism, wherein a contents of memory are compressed using a predetermined compression algorithm;

a memory deduplication mechanism, wherein duplicate memory pages are identified and a single copy of the duplication memory pages are retained and shared among more than one virtual machine; and a delta encoding mechanism, wherein, for two pages having similar but not identical contents, only one of the two pages is retained along with a delta which encodes differences between the two pages.

23. The method of claim 20, wherein the detecting that a first VM needs more memory comprises one or more of:

detecting that an amount of free memory available to said first VM is decreasing and approaching zero;

detecting that said first VM has no free memory and is paging; and making a prediction of memory needs of said first VM based on a past performance.

24. The method of claim 20, as embodied in set of computer-readable instructions stored in a non-transitory, computer-readable storage device.

25. A method of controlling a memory allocation among a plurality of concurrently-running virtual machines (VMs), said method comprising:

setting a target central processing unit (CPU) usage level for each VM of said plurality of concurrently-running VMs;

monitoring a CPU usage and a memory usage of each VM of said plurality of concurrently-running VMs, as executed by at least one processor on at least one computer;

detecting that a virtual machine of said plurality of concurrently-running VMs is exceeding its target CPU usage level; and reducing a level of a memory optimization being executed on said virtual machine detected as exceeding its target CPU usage level.

* * * * *